(12) United States Patent
Ramaswamy et al.

(10) Patent No.: US 11,537,690 B2
(45) Date of Patent: Dec. 27, 2022

(54) END-POINT MEDIA WATERMARKING

(71) Applicant: The Nielsen Company (US), LLC, New York, NY (US)

(72) Inventors: Arun Ramaswamy, Tampa, FL (US); Timothy Scott Cooper, Tarpon Springs, FL (US); Jeremey M. Davis, New Port Richey, FL (US); Alexander Topchy, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 86 days.

(21) Appl. No.: 16/405,130

(22) Filed: May 7, 2019

(65) Prior Publication Data

US 2020/0356643 A1    Nov. 12, 2020

(51) Int. Cl.
*G06F 21/16* (2013.01)

(52) U.S. Cl.
CPC ...... *G06F 21/16* (2013.01); *G06F 2221/0733* (2013.01)

(58) Field of Classification Search
CPC ............ G06F 21/16; G06F 2221/0733; H04N 2005/91335; H04N 2201/3233; H04L 2209/608
See application file for complete search history.

(56) References Cited

U.S. PATENT DOCUMENTS

| 6,157,330 | A | 12/2000 | Bruekers et al. |
| 6,507,299 | B1 | 1/2003 | Nuijten |
| 7,155,159 | B1 | 12/2006 | Weinblatt et al. |
| 7,197,156 | B1 * | 3/2007 | Levy ...................... G06T 1/0028 |
| | | | 382/100 |
| 7,266,697 | B2 | 9/2007 | Kirovski et al. |
| 7,587,732 | B2 | 9/2009 | Wright et al. |
| 8,300,885 | B2 * | 10/2012 | Vestergaard ....... H04N 1/32208 |
| | | | 704/500 |
| 8,355,910 | B2 | 1/2013 | McMillan et al. |
| 8,451,086 | B2 | 5/2013 | Petrovic et al. |
| 8,768,714 | B1 * | 7/2014 | Blesser ................. G10L 19/018 |
| | | | 380/236 |
| 8,863,218 | B2 | 10/2014 | Wright et al. |

(Continued)

FOREIGN PATENT DOCUMENTS

| EP | 2109237 | 10/2009 |
| KR | 20150023339 | 3/2015 |
| WO | 01/71960 | 9/2001 |

OTHER PUBLICATIONS

International Searching Authority, "Search Report and Written Opinion," issued in connection with PCT patent application No. PCT/US2020/031424, dated Aug. 26, 2020, 12 pages.

*Primary Examiner* — Khang Do
(74) *Attorney, Agent, or Firm* — Hanley, Flight & Zimmerman, LLC

(57) ABSTRACT

Apparatus, systems, methods, and articles of manufacture related to end-point media watermarking are disclosed. An example device includes a media receiver to receive a media signal, a watermark generator to generate a watermark, a trigger to activate the watermark generator to generate the watermark based on an external input, an encoder to encode the media signal with the watermark to synthesize an encoded media signal, a media output to render the encoded media signal.

14 Claims, 5 Drawing Sheets

(56) References Cited

U.S. PATENT DOCUMENTS

| | | | |
|---|---|---|---|
| 8,918,326 B1* | 12/2014 | Blesser | G06K 9/52 704/500 |
| 9,503,536 B2 | 11/2016 | Bosworth et al. | |
| 9,881,623 B2* | 1/2018 | Nakamura | G10L 19/018 |
| 10,212,242 B2 | 2/2019 | Bosworth et al. | |
| 10,236,006 B1* | 3/2019 | Gurijala | G10L 19/06 |
| 10,623,511 B2 | 4/2020 | Bosworth et al. | |
| 11,269,976 B2* | 3/2022 | Khan | H04M 3/568 |
| 2001/0044899 A1* | 11/2001 | Levy | G07F 7/1008 713/176 |
| 2002/0026635 A1* | 2/2002 | Wheeler | H04N 7/173 725/19 |
| 2002/0029338 A1* | 3/2002 | Bloom | H04N 19/467 713/176 |
| 2003/0021439 A1* | 1/2003 | Lubin | G06T 1/0085 382/100 |
| 2003/0103645 A1* | 6/2003 | Levy | G06Q 20/341 707/E17.112 |
| 2003/0112996 A1* | 6/2003 | Holliman | H04N 19/117 375/E7.146 |
| 2004/0015362 A1* | 1/2004 | Rhoads | G07F 7/12 704/273 |
| 2004/0073916 A1* | 4/2004 | Petrovic | H04N 21/8358 725/18 |
| 2005/0025335 A1* | 2/2005 | Bloom | G06T 1/0085 382/100 |
| 2006/0239503 A1* | 10/2006 | Petrovic | G06T 1/0071 382/100 |
| 2006/0282676 A1* | 12/2006 | Serret-Avila | H04N 5/913 713/176 |
| 2007/0140523 A1* | 6/2007 | Parisis | G06T 1/0028 382/100 |
| 2008/0056531 A1* | 3/2008 | Zhao | H04N 1/32304 382/100 |
| 2008/0126420 A1* | 5/2008 | Wright | H04N 21/845 348/E7.071 |
| 2008/0137903 A1* | 6/2008 | Nakamura | H04N 1/32251 382/100 |
| 2008/0191816 A1* | 8/2008 | Balachandran | H04L 47/11 333/24 R |
| 2009/0136087 A1* | 5/2009 | Oren | G06T 1/0021 382/100 |
| 2009/0158318 A1* | 6/2009 | Levy | H04N 21/8358 386/249 |
| 2010/0080413 A1* | 4/2010 | Chen | H04N 21/41407 382/100 |
| 2011/0111713 A1* | 5/2011 | Park | H04H 20/22 455/154.1 |
| 2011/0176060 A1* | 7/2011 | Lee | H04L 1/0001 348/723 |
| 2011/0224992 A1 | 9/2011 | Chaoui et al. | |
| 2012/0272327 A1* | 10/2012 | Shin | G06F 21/16 726/26 |
| 2013/0251189 A1* | 9/2013 | McMillan | H04N 21/44008 382/100 |
| 2013/0312019 A1* | 11/2013 | McMillan | H04H 60/31 725/14 |
| 2014/0040929 A1* | 2/2014 | Mears | H04H 60/45 725/10 |
| 2014/0108020 A1* | 4/2014 | Sharma | G10L 25/87 704/500 |
| 2014/0129841 A1* | 5/2014 | McMillan | G06F 21/16 713/176 |
| 2014/0142958 A1* | 5/2014 | Sharma | G10L 19/02 704/500 |
| 2014/0254801 A1* | 9/2014 | Srinivasan | G10L 19/018 381/17 |
| 2014/0280874 A1 | 9/2014 | Bosworth et al. | |
| 2014/0321695 A1* | 10/2014 | Srinivasan | G10L 19/018 382/100 |
| 2015/0067712 A1* | 3/2015 | Lee | H04N 21/84 725/19 |
| 2015/0181269 A1* | 6/2015 | McMillan | H04N 21/4383 725/19 |
| 2015/0242985 A1* | 8/2015 | Reed | G06T 1/0028 382/100 |
| 2015/0319490 A1* | 11/2015 | Besehanic | H04N 21/44222 725/19 |
| 2016/0019901 A1* | 1/2016 | Topchy | G10L 19/018 704/500 |
| 2016/0072599 A1* | 3/2016 | Kariyappa | G11B 20/10527 700/94 |
| 2016/0078874 A1* | 3/2016 | Blesser | H04L 69/22 370/470 |
| 2016/0094877 A1* | 3/2016 | Heffernan | H04N 21/44008 725/19 |
| 2016/0253772 A1* | 9/2016 | Kofod | G06T 1/0021 382/100 |
| 2016/0261917 A1* | 9/2016 | Trollope | H04N 21/475 |
| 2016/0295279 A1* | 10/2016 | Srinivasan | H04H 60/58 |
| 2016/0329058 A1* | 11/2016 | Lynch | G10L 25/81 |
| 2017/0018278 A1* | 1/2017 | Srinivasan | G10L 19/018 |
| 2017/0025128 A1* | 1/2017 | Blesser | G10L 19/018 |
| 2017/0025129 A1* | 1/2017 | Blesser | G10L 19/018 |
| 2017/0041410 A1 | 2/2017 | Bosworth et al. | |
| 2017/0334234 A1* | 11/2017 | Curtis | G06T 1/0028 |
| 2017/0374546 A1* | 12/2017 | Nielsen | H04W 8/22 |
| 2018/0089790 A1* | 3/2018 | Tehranchi | H04L 65/80 |
| 2018/0121635 A1 | 5/2018 | Tormasov et al. | |
| 2018/0124533 A1* | 5/2018 | Messier | H04R 29/004 |
| 2018/0165463 A1* | 6/2018 | McCreary | G06F 21/60 |
| 2019/0132652 A1* | 5/2019 | Zhao | H04N 21/23892 |
| 2019/0182344 A1 | 6/2019 | Bosworth et al. | |
| 2019/0266749 A1* | 8/2019 | Rhoads | G06T 7/74 |
| 2019/0332811 A1* | 10/2019 | Robison | H04L 63/12 |
| 2021/0289498 A1* | 9/2021 | Lapede | H04L 1/0026 |

\* cited by examiner

END-POINT MEDIA WATERMARKING

FIELD OF THE DISCLOSURE

This disclosure relates generally to media watermarking, and, more particularly, to end-point media watermarking.

BACKGROUND

Media, such as a television broadcast, may be encoded with watermarks that, when detected, are decoded to identify the media that was presented.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
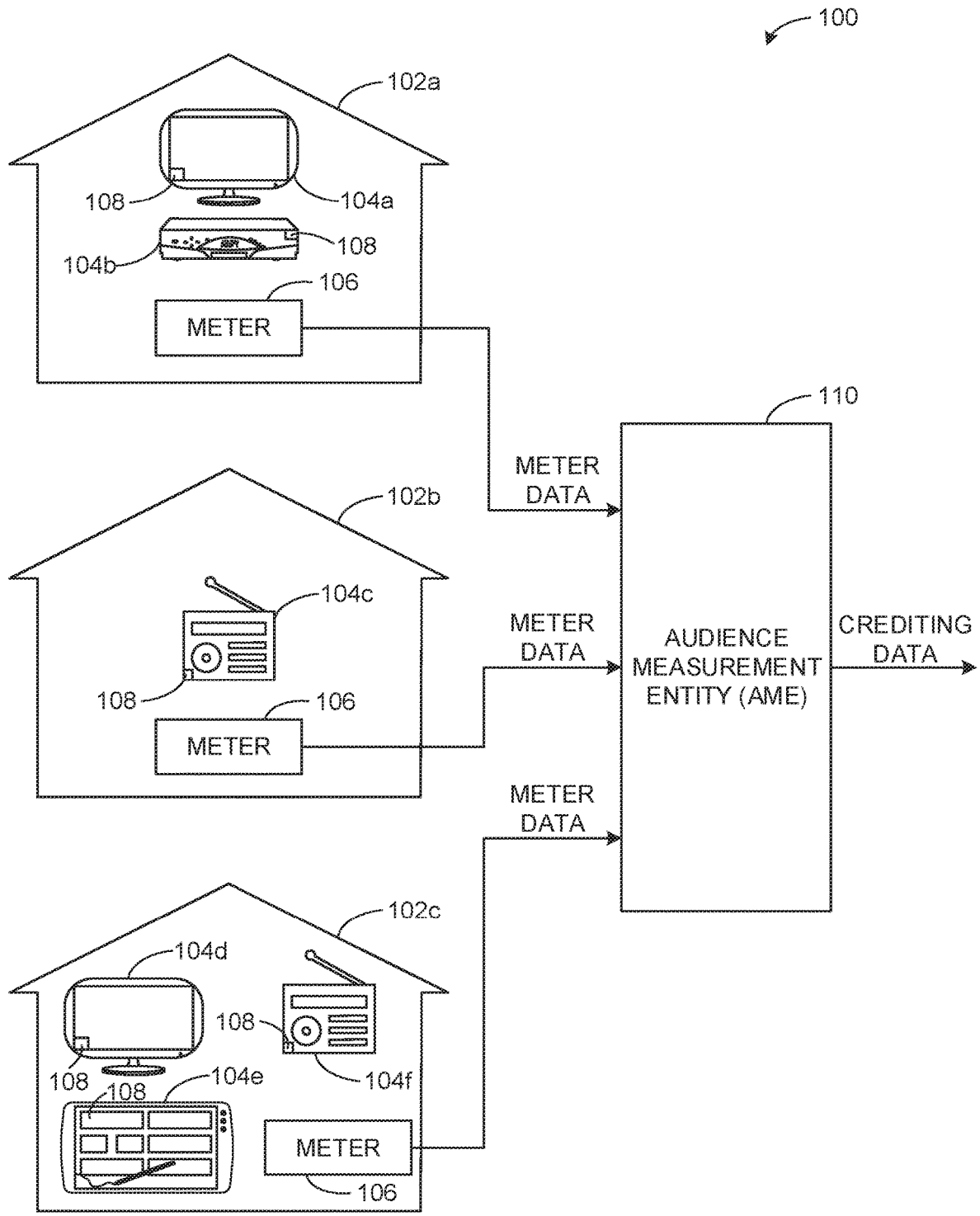
FIG. 1 is an example environment and system for end-point media watermarking that includes example media watermarking devices in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Audience measurement entities (AMEs) desire knowledge on how users interact with media devices such as, for example, smartphones, tablets, laptops, televisions, smart televisions, radios, digital video recorders, digital media players, etc. In particular, AMEs want to monitor media presentations made at the media devices to, among other things, determine ownership and/or usage statistics of media devices, relative rankings of usage and/or ownership of media devices, types of uses of media devices (e.g., whether a device is used for browsing the Internet, streaming media from the Internet, etc.), other types of media device information, and/or other monitoring information including, for example, advertisements exposure, advertisement effectiveness, user behavior, purchasing behavior associated with various demographics, etc.

Media watermarking (e.g., such as audio watermarking, video watermarking, etc.) can be used to identify media, such as television broadcasts, radio broadcasts, advertisements (television and/or radio), downloaded media, streaming media, prepackaged media, etc. Media watermarks, such as audio watermarks, are also extensively used in both radio and television to identify the station or channel to which a receiver is tuned. Existing media watermarking techniques identify media by embedding one or more codes (e.g., one or more watermarks) conveying media identifying information and/or an identifier that may be mapped to media identifying information, into an audio and/or video component of the media. In some examples, the audio or video component is selected to have a signal characteristic sufficient to hide the watermark. To identify watermarked media, the watermark(s) are extracted and, for example, decoded and/or used to access a table of reference watermarks that are mapped to media identifying information.

As used herein, the term "media" refers to audio and/or visual (still or moving) content and/or advertisements. Furthermore, as used herein, the term "media" includes any type of content and/or advertisement delivered via any type of distribution medium. Thus, media includes television programming or advertisements, radio programming or advertisements, movies, web sites, streaming media, etc.

As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose, such as tuning (e.g., a packet identifying header), copyright protection, etc. In some examples, to identify watermarked media, the watermark(s) are extracted and, for example, decoded and/or used to access a table of reference watermarks that are mapped to media identifying information.

For example, audio watermarks may be embedded at a broadcast facility and carry digital data in the form of symbols. In some applications, such as television audience measurement, a meter (also known as a metering device or media device meter) installed in a panelist's home senses or otherwise captures audio emanating from, for example, a television (TV) set and/or other media device(s). The meter performs signal processing operations on the audio to extract the watermark symbols representing digital data. In some examples, the data bits conveyed by the watermark symbols identify the TV station being received by the TV set, and may also represent a timestamp to further identify media (e.g., content and/or advertisements) being received. In the case of radio audience measurement, as well as in some television audience measurement examples, the meter may be a portable device carried or worn by the panelist to monitor media exposure in the home, as well as in other environments, such as an automobile. Media watermarks designed for radio broadcasts tend to be more robust than media watermarks designed for television broadcasts because radio broadcasts are often heard in environments characterized by relatively high ambient acoustic noise, such as in vehicles. For example, the data packets of media watermarks for radio broadcasts may be repeated multiple times to provide redundancy.

In the case of radio audience measurement, a widely used watermark is the Critical Band Encoding Technology (CBET) watermark invented by Jensen, et al. See U.S. Pat.

Nos. 5,450,490 and 5,764,763. See also U.S. Pat. Nos. 6,845,360 and 6,871,180. In CBET watermarking, each data packet includes 32 bits of which 16 bits are used for station identification and the remaining 16 bits are used for a timestamp. CBET watermarking can also be used for television audience measurement.

CBET watermarks are constructed using symbols representing four bits of data. Each symbol is encoded in 400 milliseconds (ms) of host audio and is created by embedding a particular set of ten tones representing each symbol, with different sets of tones being used to represent different symbol values. Each tone belongs to a code band or frequency clump that includes several closely spaced frequencies of the audio. The code tones are in the frequency range 1 kilohertz (kHz) to 3 kHz in the case of CBET watermarking.

In some examples, to make these code tones imperceptible to the human ear, the amplitude of each of the tones is controlled by a "masking" energy offered by the host audio in a set of frequency bands (or code bands) in which these tones reside. Host audio that is rich in spectral energy in these code bands will support higher code tone amplitudes due to psycho-acoustic perception characteristics of the human ear. However, the masking characteristics do not remain constant across a 400 ms block of audio. In some examples, the masking characteristics are recalculated frequently at intervals as short as 2 ms.

Even with the resulting amplitude modulation of the code tones, the code tones can be successfully detected by signal processing techniques used for watermark detection, such as a Discrete Fourier Transform (DFT) performed on an audio block of 256 milliseconds lying anywhere within the 400-millisecond block of audio to determine the respective energies of the different frequencies, or tones, included in the audio. Each of the code tones included in the watermark symbol will tend to have significantly higher energy than other members of the code band associated with that tone. In some watermark detection procedures, the energy of each potential code tone of the audio is normalized relative to (e.g., divided by) the average energy in its code band. By adding the normalized energy of the set of code tones (e.g., all the ten tones) representing a symbol, a strength metric (or, in other words, a strength value) for the symbol may be determined. A winning symbol, representing the decoded watermark symbol, may be selected by comparing the strength metrics of all potential symbols and selecting the winning symbol to be the potential symbol with the largest strength metric. In some examples, the winning symbol is considered valid if its strength metric exceeds a threshold.

In radio audience measurement scenarios in which much of the listening occurs in a high ambient noise environment, such as a moving automobile, the energy of the embedded watermark tones is an important factor in the successful detection of the watermarks. Spectrally rich content, such as music, typically contains more masking energy across the ten code bands relative to content consisting of speech. To allow for these variations, the watermarks are generally repeated multiple times. For example, the CBET watermark message includes twelve symbols and the total duration is 12×0.4=4.8 seconds. In some such examples, the same watermark message, including station identification and timestamp, is repeated for an entire minute of audio. The detection process takes advantage of this redundancy, namely, every 400 ms block that is separated in time by 4.8 seconds is likely to carry the same symbol or, in other words, the same set of ten tones. The watermark symbol tone energies can be summed across blocks separated by 4.8 seconds to yield a significantly more robust watermark decoding result. Thus, in some such examples, even spectrally weak content, such as speech, yields a few detections every minute.

Thus, in some examples, the CBET watermark detection process performed in a metering device involves analyzing a block of audio samples corresponding to 256 ms to determine the presence of a valid CBET symbol. In general, the 400 ms symbol block boundaries are not known to the decoding process operating in the meter. Therefore, a scan operation that includes sliding a 256 ms window across the audio stream may be performed. This is usually performed in sliding increments that could be as large as 100 ms.

In some examples, an audio component of media (also referred to as the host audio) can carry multiple watermarks, which overlap in time, using frequency multiplexing. For example, CBET watermarking supports four layers in which each layer uses distinct sets of code tones to represent its associated symbols (e.g., with different layers using different sets of code tones). In some examples of CBET watermarking for radio, just one of these layers, which is called the local layer, is used for encoding watermarks. In some examples of CBET watermarking for television, such as examples in which networks deliver programs to local affiliates, two layers of watermarking, called the network layer and the local layer, are used for encoding watermarks.

In some examples, watermarks are embedded at the broadcaster, at the content origin, or at other intermediaries prior to media broadcast, streaming, or other means of delivery to the consumer (e.g. DVD) and its final playback or rendering. This embedding can be done in the baseband, e.g. in pulse-code modulation (PCM) domain for audio signals.

New media compression standards are ever appearing. Significant technological and algorithmic problems are solved in order to embed watermarks in the compressed media. In addition, watermarks, once embedded, can be difficult to remove, overwrite, or alter, without degrading the signal quality, e.g. audio fidelity. Furthermore, information payload for watermarks that are embedded at the broadcaster, at the content origin, or at other intermediaries prior rendering is the same for all consumers of the same watermarked content, and cannot differ or be changed for individual end-points of the same media playback. "End-point" refers to a point of rendering the media.

The example disclosed herein enable watermark generation at the end-point of media consumption, including, for example, at smart loudspeaker(s), smart display(s), and/or other capable rendering device(s) that can synthesize and mix watermarks on the fly (i.e., dynamically and/or in real-time) during media playback. "Smart device," "media rendering device," "connected device," and "playback device" are used interchangeably herein.

In some examples disclosed herein, watermark generation instructions or code is installed on a media rendering device including a smart device via, for example, firmware, a software upgrade, or a built-in hardware chip. In some examples, the watermark generation instructions or code is installed via a media watermarking device included in and/or added to the media rendering device.

In some examples disclosed herein, analysis of the media is performed by the media watermarking device in real-time, in order to determine the watermark signal shaping for perceptually masking the watermark with minimal media quality loss.

The media watermarking device can, in some examples, execute watermark signal generation appropriate for the content being played in real-time. Watermark signal can be in the baseband of the media signal, such as, for example, in the audio PCM domain.

Also, in some examples, the generated watermark has an information payload that can be defined dynamically or statically. For example, the payload can be completely or partially determined by the media rendering or playback device itself. For example, the payload has a timestamp value, device identifier, or other information available to the media rendering device. In some examples, the payload can be pre-assigned by the AME.

In some examples, the payload can be completely or partially determined externally, in real-time or otherwise, by (a) receiving the payload information on a side-channel such as, for example, over the internet or other communication channel for a connected device synchronously or asynchronously with the content (i.e., the media), (b) extracting payload information from metadata accompanying the media, and/or (c) building the payload from content recognition, such as, for example, when metadata is insufficient.

The command or trigger for initiating watermark insertion can come from the metadata accompanying the media, be embedded in the media, signaled over the internet or other communication channel, and/or started/stopped by consumer, by the meter (e.g. in the room), and/or by the AME.

In some examples, watermark insertion is triggered by a meter. For example, a person, who may be a panelist for an AME, may have a meter in a room of their house and/or on their person. For example, the meter may be a wearable device such as a portable people meter (PPM), smartphone, smartwatch, etc. The meter can provide signaling to an encoder in the meter watermarking device of the media rendering device. The signaling could include a WIFI signal, a Bluetooth signal, an RF beacon, an acoustic signal, and/or a combination of signals. The signal indicates the presence of the meter, which initiates the watermark generation. In some examples, the signal is a one-way signal from the meter to the media rendering device.

Once triggered, the media rendering device mixes or otherwise adds the generated watermarks into rendering of the respective channels of media signals in real-time for playback. In some examples, the media signals into which watermarks are inserted include, for example, audio signals, video signals, images, printed media, tactile media, RF signals, or any other type of media and/or signals in which insertion of an imperceptible signal can be of benefit for audience measurement, media recognition, media identification, audience recognition, audience identification, forensic purposes, privacy purposes, ownership identification, tracking and/or any other purpose.

Some examples also include a feedback loop from the meter to the media rendering device. The feedback delivered via the feedback loop can be used to adaptively change the level of encoding and/or other characteristics of a generated watermark. For example, watermark generation can depend or change between different households or different metering environment if a meter can signal the quality or some measure of the strengths of received watermarks.

With watermark insertion at the media rendering device, a household or other location can receive unaltered content or media from the broadcast, streaming, and/or other distribution source. In some examples, unaltered content includes less data and results in faster transmission and/or downloading time.

FIG. 1 is an example environment 100 for end-point media watermarking in accordance with the teachings of this disclosure. The example environment 100 represents portions of an example media monitoring system. The example environment 100 includes an example first household 102a, an example second household 102b, an example third household 102c. In some examples, the example households may be example rooms or areas of one household. In other examples, the example households may be a place of business, a school, an outdoor area, a car, and/or other venue or environment. The example first, second, and third households 102a-c of the illustrated example of FIG. 1 are locations where media monitoring is performed. For example, the first, second, and third households 102a-c can be panelist households.

The example environment 100 also includes a plurality of example media rendering devices that playback or otherwise present media and are distributed throughout the environment 100 including, for example, an example first television 104a, an example digital video recorder 104b, an example first radio 104c, an example second television 104d, an example tablet 104e, and an example second radio 104f. Any number or types of media rendering devices or combination of devices may be included in the environment 100.

The example environment also includes example media device meters or meters 106. The example meters 106 monitor media presentation on one or more of the media presentation devices 104a-f. The example meters 106 of the illustrated example of FIG. 1 collect data pertaining to media consumption in the respective first, second, and third households 102a-c. For example, there may be one meter 106 per household or room. In some examples, the meters 106 include microphones, direct connections (e.g., data connections) to the respective media rendering devices 104a-f, wireless connections to the respective media rendering devices 104a-f, cameras, and/or any other components to enable media monitoring. In some examples, the meters 106 are directly wired or otherwise directly communicatively coupled connected to the respective media rendering devices 104a-f. In other examples, the meters 106 are coupled to one or more of the media rendering devices 104a-f via intermediary devices such as, for example, a set top box and/or an over-the-top device.

The example media rendering devices 104a-f include a respective media watermarking device 108. In some examples, the media watermarking device 108 includes hardware, firmware, and/or software. The meter watermarking device 108 encodes media signals with watermarks at the point of rendering the media. The media signals with the encoded watermarks are presented via one or more of the media rendering devices 104a-f.

The example meters 106 detect the media signals with the encoded watermarks. The watermarks provide meter data. The meters 106 transmit the meter data to an example AME 110, where the meter data can be processed for identification of the media.

The example AME 110 of the illustrated example of FIG. 1 is an entity responsible for collecting media monitoring information. The example AME 110 collects meter data from the first, second, and third households 102a-c. In some examples, the AME 110 is associated with one or more locations (e.g., a central facility) where data is aggregated and/or analyzed. The example AME 110 assesses the meter data and identify media presented on the media rendering devices 104a-f. In response to identifying the media (e.g. media presented on the media rendering devices 104a-f), the AME 108 can generate crediting data to credit presentation of the identified media such as, for example, to include the presentation of the identified media in a ratings determination.

Figure 2:
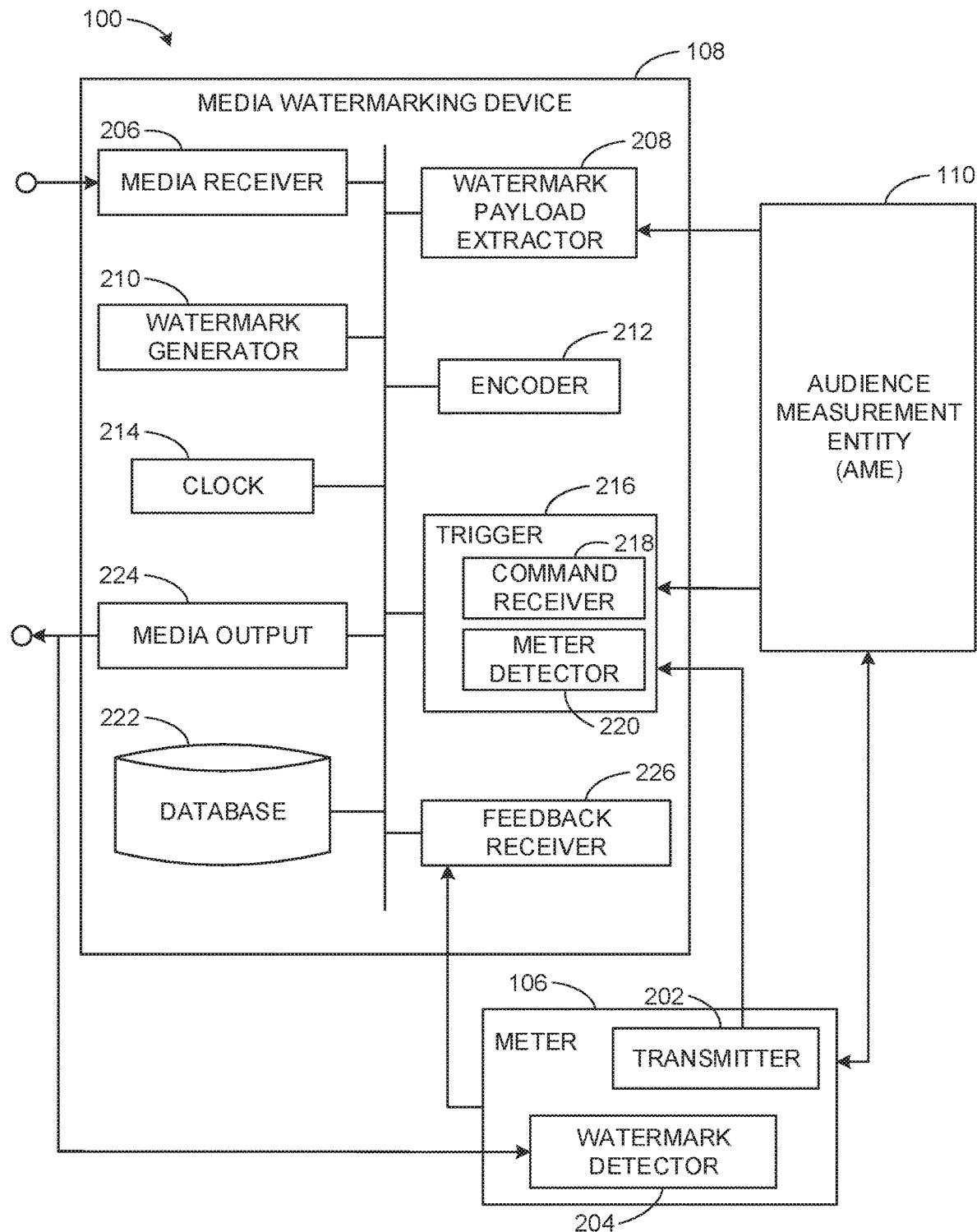
FIG. 2 is a block diagram of one of the example media watermarking devices of FIG. 1 constructed in accordance with the teachings of this disclosure.

FIG. 2 is a block diagram of a portion of the example system 100 of FIG. 1 with the households 102a-c and the media rendering devices 104a-f removed and with a focus on one of the example media watermarking devices 108 and one of the example meters 106 for clarity. As shown in FIG. 2, the example system 100 includes the example meter 106, the example media watermarking device 108, and the example AME 110. The meter 106 includes an example transmitter 202 and an example watermark detector 204. The example media watermarking device 108 includes an example media receiver 206, and example watermark payload extractor 208, an example watermark generator 210, and example encoder 212, an example clock 214, and an example trigger 216. The trigger 216 includes an example command receiver 218 and an example meter detector 220. The media watermarking device 108 also includes an example database 222, an example media output 224, and an example feedback receiver 226.

The media receiver 206 receives a media signal from, for example, a media content provider, distributor, and/or other source of media. In some examples, the media receiver 206 implements means for receiving a media signal. The receiving means may be implemented by a processor such as the processor 412 of FIG. 4 executing instructions such as the instructions of FIG. 3.

In some examples, the watermark payload extractor 208 analyzes the media signal to determine a watermark payload. In some examples, the watermark payload extractor 208 implements means for extracting a watermark payload. The extracting means may be implemented by a processor such as the processor 412 of FIG. 4 executing instructions such as the instructions of FIG. 3.

The watermark payload extractor 208 may base the watermark payload on elements of the media carried by the media signal and/or characteristics of the media signal such as, for example, program identification information, program version information, broadcast information, channel, time, date, duration, etc. In some examples, the watermark payload extractor 208 bases the watermark payload on a characteristic of the structure and/or operating status of the rendering device 104a-f such as, for example, a device identification such as serial or model number, a device type, a volume status, a closed captioning status, a user name, user address, user demographic information, a location of the device, a movement of the device, etc. The watermark payload extractor 208 can build or extract the watermark payload using any combination of this information and/or other types of information used to identify aspects of the media presented and the device on which the media was presented.

Also, in some examples, the watermark payload extractor 208 dynamically or statically defines the watermark payload. For example, the payload can be completely or partially determined by the media rendering device 104a-f itself via the watermark payload extractor 208 as noted above. Furthermore, in some examples, the watermark payload extractor 208 builds the watermark payload by extracting the information used to build the watermark payload from metadata accompanying the media and/or by building the payload from content recognition, such as, for example, when metadata is insufficient.

Also, in some examples, the watermark payload is determined by the AME 110 or other external source and sent to the media watermarking device 108. The AME 110 can determine the watermark payload in real-time or the AME 110 can transmit a pre-assigned watermark payload. The watermark payload extractor 208 receives the payload information on a side-channel such as, for example, over the internet or other communication channel for a connected device synchronously or asynchronously with receipt of the content (i.e., the media) by the media receiver 206.

In some examples, the watermark payload may be a combination of dynamically determined information and pre-determined information. For example, the watermark payload extractor 208 may determine the watermark payload via a combination of information provided externally by, for example, the AME 110, and information determined internally within the media watermarking device 108.

The watermark generator 210 also analyzes the media signal received at the media receiver 206 and the payload extracted at or by the watermark payload extractor 208. In some examples, the watermark generator 210 implements means for generating a watermark. The generating means may be implemented by a processor such as the processor 412 of FIG. 4 executing instructions such as the instructions of FIG. 3.

The watermark generator 210 analyzes the media signal and the payload to determine the watermark signal shaping for perceptually masking the watermark within the media to obscure the watermark from human perception with minimal loss to the quality of the media. The watermark generator 210 generates the watermark based on the watermark payload and the watermark signal shaping. In some examples disclosed herein, analysis of the media is performed by the watermark generator 210 in real-time such that the watermark generator 210 generates watermarks for media concurrently with playing or rendering of the media.

The encoder 212 synthesizes an encoded media signal by mixing, adding, and/or encoding the media signal with the watermark generated by the watermark generator 210. In some examples, the encoder 212 implements means for encoding a media signal. The encoding means may be implemented by a processor such as the processor 412 of FIG. 4 executing instructions such as the instructions of FIG. 3.

In some examples, the encoder 212 encodes the watermark into a baseband of the media signal such as, for example, in the audio PCM domain. In other examples, the encoder 212 encodes the generated watermarks into another channel or combination of channels of the media signals for playback.

The trigger 216 activates the creation of the watermark. Thus, in some examples, the trigger 216 activates the watermark payload extractor 208 to extract the watermark payload information and/or the watermark generator 210 to generate the watermark and/or the encoder 212 to insert or encoded the media signal with the watermark. In some examples, the trigger 216 implements means for activating the means for generating to generate the watermark. The activating means may be implemented by a processor such as the processor 412 of FIG. 4 executing instructions such as the instructions of FIG. 3.

In some examples, the trigger 216 activates the building, generation, and encoding of the watermark based on an external input. The trigger 216 includes the command receiver 218 and the meter detector 220 to receive or detect the external input. In some examples, the external input that causes the trigger 216 to activate is a command received by the media watermarking device 108 from an outside entity including, for example, from the AME 110. The command may be received over a communication link, such as the internet, to the command receiver 218. In some examples, the AME 110 sends a command to cease watermark payload extraction, watermark generation, and/or watermark encoding or insertion.

In some examples, the command or trigger for initiating watermark payload extraction, watermark generation, and/or watermark encoding or insertion can come from the metadata accompanying the media and/or otherwise be embedded in the media. In such examples, the command receiver 218, which is in communication with the media receiver 206, detects the command directly from the media signal.

In some examples, the external input that causes the trigger 216 to activate is a detection of a presence of the meter 106 or otherwise a signal from the meter 106. For example, a person, who may be a panelist for the AME 110 or other consumer, may have the meter 106 in a room of their house and/or the meter 106 may be a wearable meter that is worn on their person. In this example, the meter 106 provides signaling to the encoder 212 via the meter detector 220 of the trigger 216. The signal indicates the presence of the meter 106, which initiates the watermark payload extraction and/or the watermark generation. Such signal may be broadcast, emitted, and/or presented from the transmitter 202 of the meter 106. In some examples, the signal of the presence of the meter 106 is a signal indicating the physical proximity of the meter 106 and the media rendering device 104a-f. In some examples, the physical proximity is that the meter 106 and the media rendering device 104a-f are in the same room. In some examples, the signal is a one-way signal from the meter 106 to the watermarking device 108, which as disclosed with reference to FIG. 1, may be incorporated the media rendering device 104a-f. In some examples, the panelist or consumer may start and/or stop the meter 106 or a triggering signal from the meter, which is detected by the meter detector 220 to start/stop watermark payload extraction, watermark generation, and/or watermark encoding or insertion.

In some examples, the AME 110 or other external entity can enable watermarking of the media signal for a subset of panelists or consumers. The AME 110 may send a trigger signal through the command receiver 218 and/or the AME 110, when in control of the meter 106, may configure settings of the meter 106 remotely to cause the meter 106 to send a triggering signal to the meter detector 220. In these examples, the AME 110 can activate watermark payload extraction, watermark generation, and/or watermark encoding or insertion for a subset of panelists by sending the trigger signal to only those panelists' media watermarking device 108. For example, the AME 110 may want to gather media monitoring information for a segment of the audience such as, for example, 25-45 year panelists, and/or for an audience of particular program, and/or for an audience at a particular time of day, and/or other customized audience segments. This allows for reduced costs in media monitoring because only a portion of media watermarking devices 108 would operate in this scenario to activate watermark payload extraction, watermark generation, and/or watermark encoding or insertion for media monitoring.

The clock 214 may be used to track the time since the trigger 216 had been activated. In some examples, the trigger 216 is deactivated after a period of time after receipt of the external input. In other examples, the trigger 216 may be deactivated based on receipt of a deactivation signal by the command receiver 218 and/or the lack of detection of the meter 106 by the meter detector 220.

The media watermarking device 108 also includes the database 222, which can store details of operation of the media watermarking device 108 including, for example, the media signals, portions of the media signals, the watermark payload, any and/or all information used to build the watermark payload, the generated watermarks, the encoded media signals, received command, detected meters, logs of activity, etc.

The media output 224 renders the encoded media signal. For example, the media output 224 sends the encoded media signal to the media rendering device 104a-f for presentation to the panelist or other consumer. In some examples, the media output 224 implements means for rendering the encoded media. The rendering means may be implemented by a processor such as the processor 412 of FIG. 4 executing instructions such as the instructions of FIG. 3.

The meter 106 also detects the encoded media signal output by the media output 224. The meter 106 includes the watermark detector 204 that extracts, decodes, and/or determines the watermark inserted or encoded into the media signal. The detected watermarks and/or information extracted from the detected watermark may be communicated to the AME 110 via, for example, the transmitter 202.

In addition, some examples also include a feedback loop from the meter 106 to the media watermarking device 108. In some examples, the feedback loop includes the transmitter 202 sending communications, i.e. feedback, to the feedback receiver 226 of the media watermarking device 108 based on activity of the watermark detector 204. In some examples, the feedback receiver 226 implements means for means for receiving feedback such as, for example, a quality indicator. The receiving means may be implemented by a processor such as the processor 412 of FIG. 4 executing instructions such as the instructions of FIG. 3.

The watermark generator 210 and/or the encoder 212 may adaptively change the level of encoding based on the feedback delivered via the feedback loop. For example, watermark generation can be customized for different households or different metering environment based on the quality or other measure of the strengths of watermarks received by the meter 106. For example, the watermark detector 204 can establish a quality indicator based on a level of watermarking detected by the meter 106. In some examples, the quality indicator includes a value corresponding to a sparsity of detected watermarks. For example, the watermark detector 204 may set a quality indicator of Strength=0, if receiving or detecting no watermarks. The watermark detector 204 can set a quality indicator of Strength=1, if receiving or detecting only very sparse watermarks. The watermark detector 204, if receiving or detecting sufficient number of watermarks, could set a quality indicator of Strength=2. In other examples, other numbers, scales, or values may be used. Also, in some examples, the quality indicator may be based on an amplitude or strength of a detected watermark. In some examples, the quality indicator may be based on a level or amount of a detected watermark that is decipherable. Other features of the watermarks and/or corresponding media signal such as, for example noise, may be used alternatively to or in combination with these features of the watermarks in assessing and assigning a quality indicator to the watermarks. The transmitter 202 sends the quality indicators to the feedback receiver 226.

Upon receiving the quality indicators, the feedback receiver 226 can determine if a threshold level of quality has been met. For example, if the threshold quality is a Strength of 1.5, and the watermark detector 204 indicates a quality of watermarks detected in the encoded media signal of Strength=2, then the quality satisfies the threshold. In this example, the encoder 212 continues encoding in the same manner that satisfies the threshold.

In another example, if the threshold quality is a Strength of 1.5, and the watermark detector 204 indicates a quality of watermarks detected in the encoded media signal of Strength=1, then the quality does not satisfy the threshold. In this example, the encoder 212 can adjust the level of encoding appropriately. For example, the encoder 212 can encode a greater frequency of watermarks in the media signal. In another example, the encoder 212 can encode watermarks with larger amplitudes to enhance the detection of the watermarks. In another example, the encoder 212 can encode watermarks in one or more other channels of the media signal. Thus, the encoder 212 can modify the encoded media signal based on the quality indicator.

While an example manner of implementing the meters 106 and the media watermarking devices 108 of FIG. 1 is illustrated in FIG. 2, one or more of the elements, processes and/or devices illustrated in FIG. 2 may be combined, divided, re-arranged, omitted, eliminated, and/or implemented in any other way. Further, the example media receiver 206, the example watermark payload extractor 208, the example watermark generator 210, the example encoder 212, the example clock 214, the example trigger 216, the example command receiver 218, the example meter detector 220, the example database 222, the example media output 224, the example feedback receiver 226, the example transmitter 202, the example watermark detector 204, and/or, more generally, the example meter 106 and/or the example media watermarking device 108 of FIG. 2 may be implemented by hardware, software, firmware, and/or any combination of hardware, software and/or firmware. Thus, for example, any of the example media receiver 206, the example watermark payload extractor 208, the example watermark generator 210, the example encoder 212, the example clock 214, the example trigger 216, the example command receiver 218, the example meter detector 220, the example database 222, the example media output 224, the example feedback receiver 226, the example transmitter 202, the example watermark detector 204, and/or, more generally, the example meter 106 and/or the example media watermarking device 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example, media receiver 206, the example watermark payload extractor 208, the example watermark generator 210, the example encoder 212, the example clock 214, the example trigger 216, the example command receiver 218, the example meter detector 220, the example database 222, the example media output 224, the example feedback receiver 226, the example transmitter 202, the example watermark detector 204, the example meter 106, and/or the example media watermarking device 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media receiver 206, the example watermark payload extractor 208, the example watermark generator 210, the example encoder 212, the example clock 214, the example trigger 216, the example command receiver 218, the example meter detector 220, the example database 222, the example media output 224, the example feedback receiver 226, the example transmitter 202, the example watermark detector 204, the example meter 106, and/or the example media watermarking device 108 of FIG. 2 may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
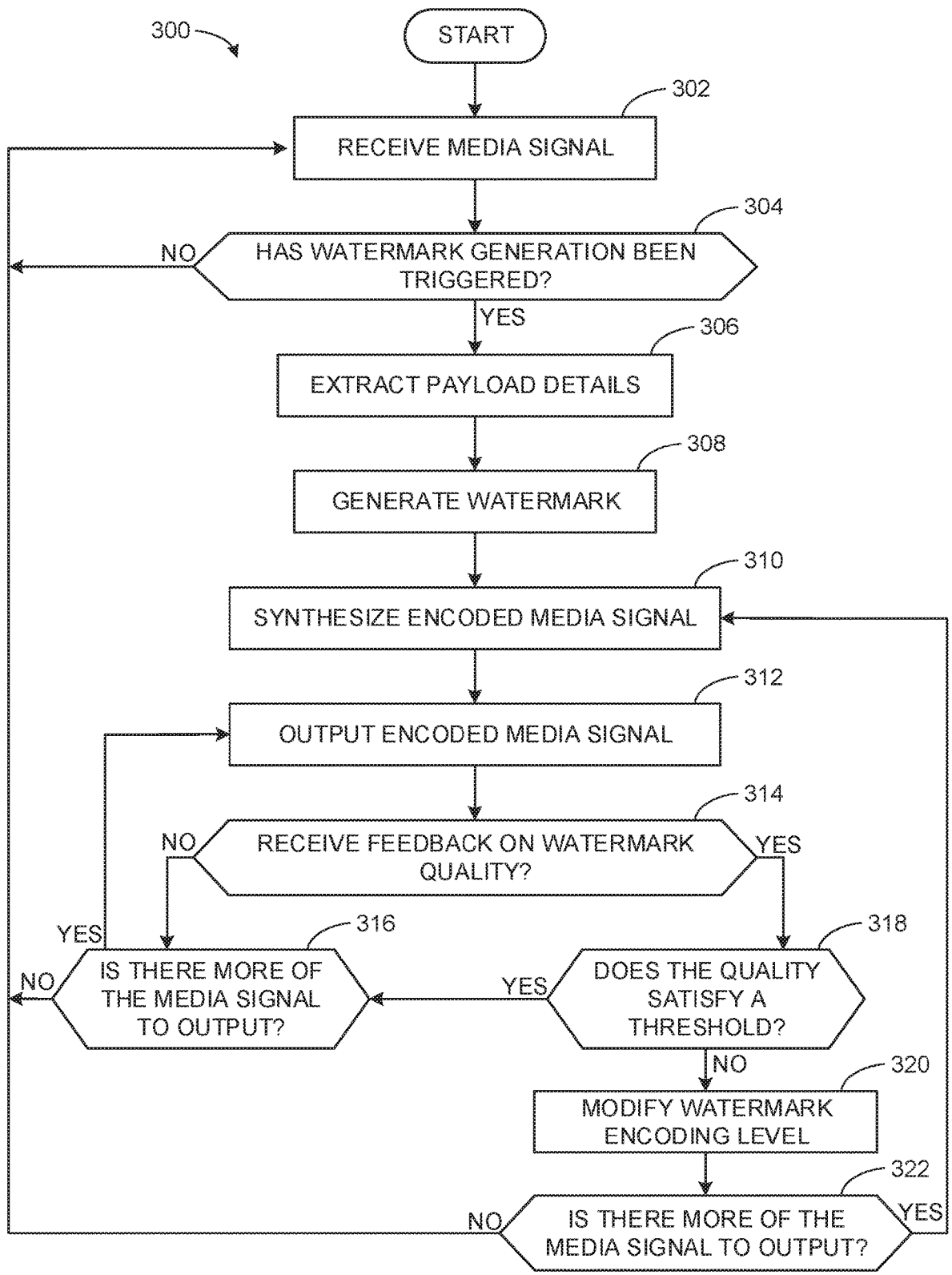
FIG. 3 is a flowchart representative of machine readable instructions which may be executed to implement the example media watermarking devices of FIGS. 1 and 2.

A flowchart representative of example hardware logic, machine readable instructions, hardware implemented state machines, and/or any combination thereof for implementing the media watermarking device 108 of FIG. 2 is shown in FIG. 3. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example media watermarking device 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example program 300 of FIG. 3 includes instructions related to the operation of the media watermarking device 108. In the program 300, the media receiver 206 receives a media signal (block 302). The trigger 216 determines if watermark generation has been triggered (block 304). For example, the trigger 216 determines if an external input prompting watermark generation has been received. In some examples, the command receiver 218 receives a command such as, for example, a command from an AME to initiate watermark generation. In other examples, the meter detector 220 receives a signal from the meter 106 or detects the presence of the meter 106, which initiates watermark generation.

If the trigger 216 determines that watermark generation has not been triggered (block 304), the program 300 returns to block 302 with the media receiver 206 receiving the media signal or another media signal.

If the trigger 216 determines that watermark generation has been triggered (block 304), the watermark payload extractor 208 extracts payload details for the watermark (block 306). In some examples, the watermark payload extractor 308 receives the payload from an external source such as, for example, the AME 110. Also in some examples, the payload is extracted from the media signal, the media watermarking device 108, and/or the rendering device 104a-f. In some examples, the watermark payload extractor pulls and/or receives the payload from a combination of sources including dynamically determined information and/or pre-determined information.

The program 300 also includes the watermark generator 210 generating the watermark (block 308) based on the payload. The watermark generator 210 generates the watermark by analyzing the media signal and the payload and determining characteristics of the watermark signal shaping to mask the watermark within the media. The watermark is masked in the media such that the watermark is not perceivable by a human and/or does not degrade the quality or playback of the media once encoded with the watermark.

The encoder 212 synthesizes an encoded media signal (block 310) by mixing, adding, and/or encoding the media signal with the watermark generated by the watermark generator 210.

The media output 224 renders or outputs the encoded media signal (block 310). For example, the media output 224 sends, broadcasts, transmits, and/or communicates the encoded media signal to one or more of the media rendering device(s) 104a-f for presentation to the panelist or other consumer.

The example program 300 also includes a feedback loop from the meter 106 to the media watermarking device 108. For example, the feedback receiver 226 determines if feedback has been received from the watermark detector 204 of the meter 106 indicative of the watermark quality (block 314). If feedback has not been received (block 314), the media output 224 determines if there is more of the media signal to output (block 316). If there is more media signal to output, the media output 224 continues to output the encoded media signal (block 312). If the media output 224 determines that there is no more of the media signal to output (block 316), the program continues with the media receiver 206 receiving a media signal (block 302).

In some examples, the feedback receiver 226 determines that feedback related to watermark quality has been received (block 314). For example, the watermark detector 204, which decodes the media signal communicated by the media output 224, and extracts the watermark may assign a quality indicator related to the watermarks. The quality indicator may be qualitative and/or quantitative. For example, the quality indicator may include a value corresponding to a level of detected watermarks. The level of detected watermarks corresponds to a number of detected watermarks, which indicates how sparsely detected or abundantly detected the watermarks are. For example, the quality indicator maybe Strength=0 when the watermark detector 204 detects no watermarks, Strength=1 when watermarks are sparsely or infrequently detected, Strength=2 when watermarks are sufficiently or abundantly detected. In other examples, other numbers, scales, or values may be used. In addition, other qualities of the watermark and/or associated media signal may be used in the assignment of a quality indicator.

The feedback receiver 226 determines the quality of the watermark satisfies a threshold level of quality (block 318). For example, if the threshold quality is a Strength of 1.5, and the feedback receiver 226 receives a watermark quality indicator of Strength=2, then the quality satisfies the threshold. If the feedback receiver 226 determines the quality of the watermark satisfies a threshold level of quality (block 318), the media output 224 determines if there is more of the media signal to output (block 316). If there is more media signal to output, the media output 224 continues to output the encoded media signal (block 312) in the same manner of encoding that satisfies the threshold. If the media output 224 determines that there is no more of the media signal to output (block 316), the program continues with the media receiver 206 receiving a media signal (block 302).

In another example, if the threshold quality is a Strength of 1.5, and the feedback receiver 226 receives a watermark quality indicator of Strength=1, then the quality does not satisfy the threshold. If the feedback receiver 226 determines the quality of the watermark does not satisfy a threshold level of quality (block 318), the encoder 212 adjusts or modifies the level of encoding (block 320). For example, the encoder 212 can adjust frequency or amplitudes of watermarks in the media signal.

With the level of encoding modified by the encoder (block 320), the media output 224 determines if there is more of the media signal to output (block 322). If there is more media signal to output, the encoder 212 synthesizes the encoded media in accordance with the modified level of encoding (block 310), and the program 300 continues with the media output 224 outputting the encoded media signal (block 312). If the media output 224 determines that there is no more of the media signal to output (block 322), the program continues with the media receiver 206 receiving a media signal (block 302).

Figure 4:
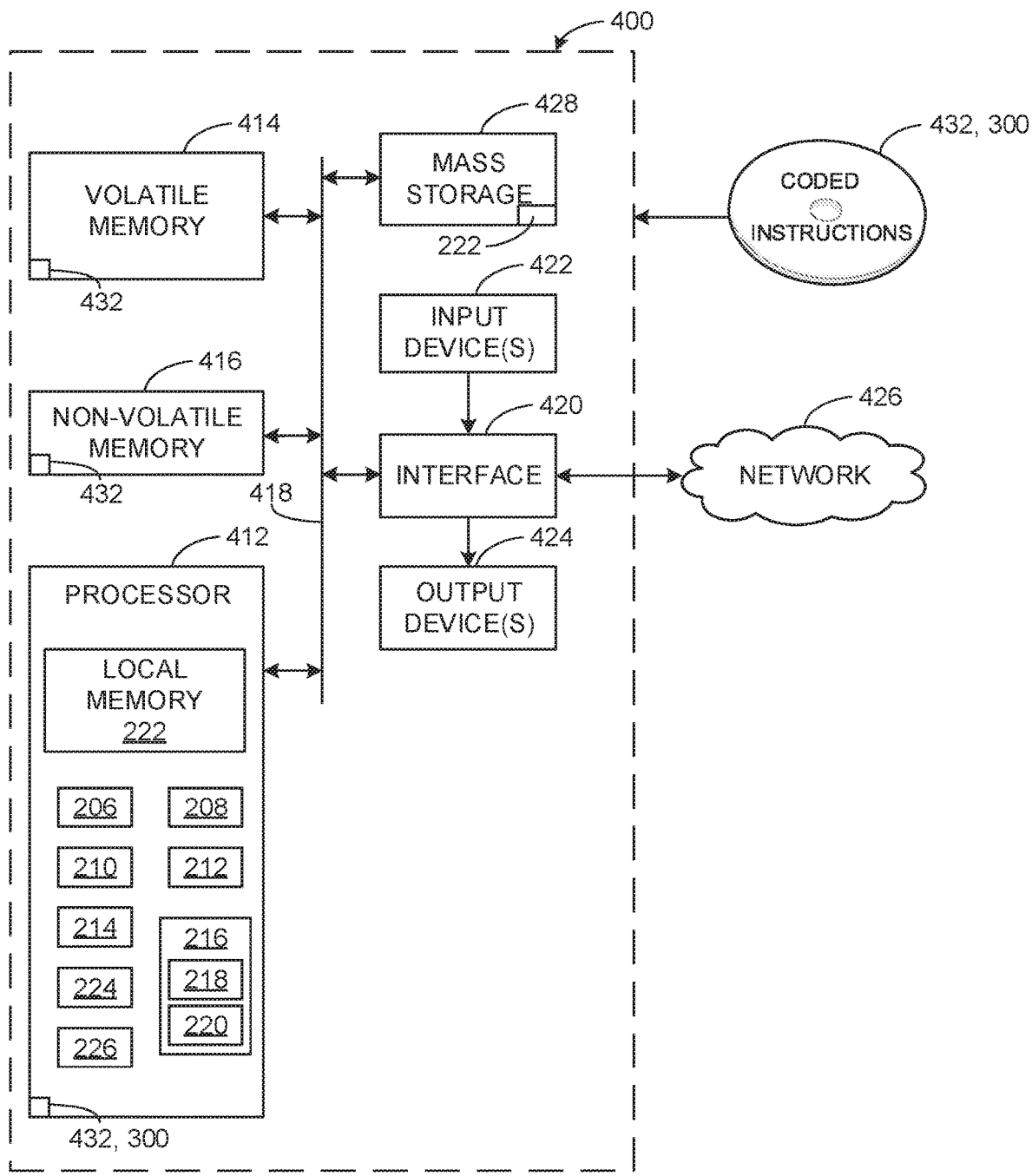
FIG. 4 is a block diagram of an example processing platform structured to execute the instructions of FIG. 3 to implement the example media watermarking devices of FIGS. 1 and 2.

FIG. 4 is a block diagram of an example processor platform 400 structured to execute the instructions of FIG. 3 to implement the media watermarking device 108 of FIGS. 1 and 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 412 implements the media receiver 206, the watermark payload extractor 208, the watermark generator 210, the encoder 212, the clock 214, the trigger 216, the command receiver 218, the meter detector 220, the media output 224, and the feedback receiver 226.

The processor 412 of the illustrated example includes a local memory 222 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 420 of the illustrated example, thus, typically includes a graphics driver card, a graphics driver chip, and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 406. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432, 300 of FIG. 3 may be stored in the mass storage device 428, in the volatile memory 414, in the non-volatile memory 416, and/or on a removable non-transitory computer readable storage medium such as a CD or DVD.

Figure 5:
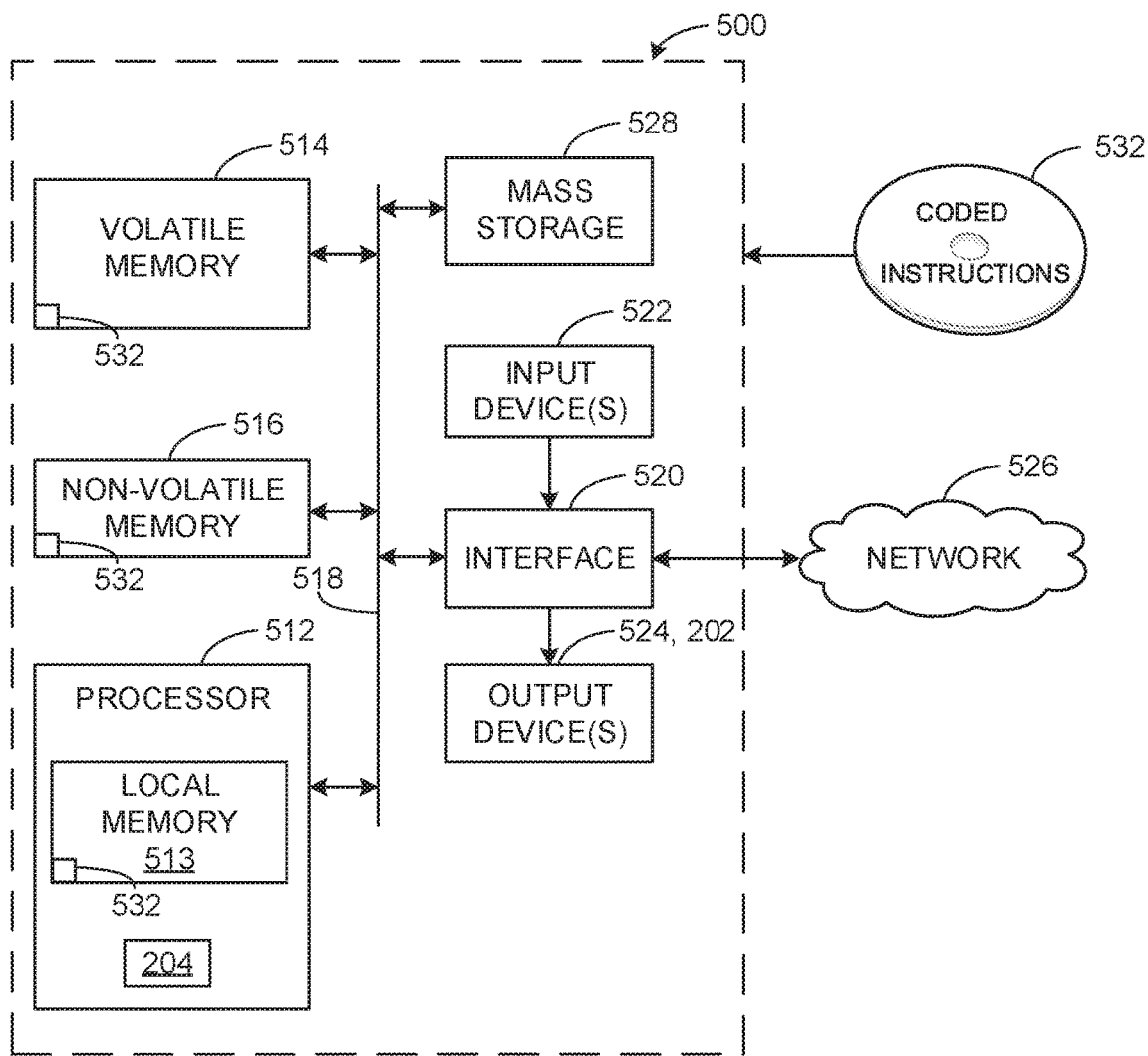
FIG. 5 is a block diagram of an example processing platform structured to execute the instructions to implement the example meters of FIGS. 1 and 2.

FIG. 5 is a block diagram of an example processor platform 500 structured to execute the instructions to implement the meter 106 of FIGS. 1 and 2. The processor platform 400 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the watermark detector 204.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by SDRAM, DRAM, RDRAM®, and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a USB, a Bluetooth® interface, an NFC interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 202, 524 are also connected to the interface circuit 520 of the illustrated example. The output devices 524 can be implemented, for example, by display devices an LED, an OLED, an LCD, a CRT display, an IPS display, a touchscreen, etc.), a tactile output device, a printer, and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 506. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and DVD drives.

The machine executable instructions 532 for operating the meter 106 may be stored in the mass storage device 528, in the volatile memory 514, in the non-volatile memory 516, and/or on a removable non-transitory computer readable storage medium such as a CD or DVD.

From the foregoing, it will be appreciated that example apparatus, devices, systems, articles of manufacture, and methods have been disclosed that enable watermark generation at the end-point of media consumption. The media rendering devices disclosed herein synthesize and mix or encode watermarks dynamically and/or in real-time or otherwise at the end point, which allows for custom watermark generation and insertions. The custom watermarks can provide more robust and detailed information about the consumer of the media rendered at these devices and more detailed information about the rendering of the media. Watermarks that are encoded prior to broadcast or transmission to an end-point of media consumption are static and may not include data specific to the consumption environment or the consumer. The detailed information provided by the end-point watermarking disclosed herein is more valuable to advertisers and media content producers.

In addition, example apparatus, devices, systems, articles of manufacture, and methods have been disclosed that enable select triggering of watermark generation and encoding into media. The select triggering of watermark generation can occur through commands received from an AME or other entity and/or via meter detection when a meter is in proximity to a rendering device. Select triggering of watermark improves the efficiency of a computing system because less resources are used in comparison to wide-spread watermark generation. In addition, less data is transmitted because fewer watermarks are generated. Furthermore, fewer computing resources are needed to review and analyze the meter data gathered from the generated watermarks because a more focused batch of watermarks are generated in accordance with the select triggering. For example an AME wanting media consumption data for a subset of households (e.g., households matching a select demographic profile) can selectively trigger watermark generation for the subset of households. A wide-scale watermark generation is avoided in this example. In addition, the AME will obtain the results of the select watermark generation and save the resources otherwise needed to sort and analyze batches of meter and watermark data to obtain the data related to the selected subset.

In addition, example apparatus, devices, systems, articles of manufacture, and methods have been disclosed that enable immediate and proximate feedback of the quality of the watermark. The feedback loop disclosed herein enables the watermark generation and encoding levels to be adaptively changed dynamically and in real-time. Thus, the feedback disclosed herein enables customization of watermarks based on household, metering environment, metering equipment, media rendering device characteristics, etc. The feedback also enables the changing of watermark generation and encoding levels to enhance the detectability of the watermarks and the data gathering associated therewith.

Furthermore, with watermark insertion at the media rendering device, the consumers can receive unaltered content or media from the broadcast, streaming, and/or other distribution source. Where the unaltered content includes less data, the transmission and/or downloading time is decreases, which enhances the consumer experience. The decrease in transmission data also lowers bandwidth traffic. Thus, the disclosed apparatus, devices, systems, articles of manufacture, and methods are accordingly directed to one or more improvement(s) in the functioning computing and/or communication systems.

Apparatus, systems, methods, and articles of manufacture related to end-point media watermarking are disclosed. An example device includes a media receiver to receive a media signal, a watermark generator to generate a watermark, a trigger to activate the watermark generator to generate the watermark based on an external input, an encoder to encode the media signal with the watermark to synthesize an encoded media signal, a media output to render the encoded media signal.

In some examples, the external input is a command received by the device over a communication link.

In some examples, the command is received from an audience measurement entity.

In some examples, the external input is a detection of a presence of a meter.

In some examples, the meter is a wearable meter.

In some examples, the trigger is to deactivate the watermark generator after a period of time after receipt of the external input.

In some examples, the example device also includes a feedback receiver to receive a quality indicator based on a level of watermarking detected by a meter.

In some examples, the encoder is to modify the encoded media signal based on the quality indicator.

In some examples, the quality indicator includes a value corresponding to a sparsity of detected watermarks and the encoder is to change a level of watermark encoding based on the value.

In some examples, the example device includes a watermark payload extractor to determine a watermark payload, the watermark payload based on a characteristic of the device.

Also disclosed is an example non-transitory computer readable medium comprising computer readable instructions that, when executed, cause one or more processors to, at least: generate a watermark in a media rendering device, the watermark to be generated for a media signal received by the media rendering device, the watermark generation triggered by an external input to the media rendering device; encode the media signal with the watermark to synthesize an encoded media signal; and present the encoded media signal to a user from the media rendering device.

In some examples, the example instructions further cause the one or more processors to deactivate the watermark generation after a period of time after receipt of the external input.

In some examples, the example instructions further cause the one or more processors to receive a quality indicator based on a level of watermarking detected by a meter.

In some examples, the example instructions further cause the one or more processors to modify the encoded media signal based on the quality indicator.

In some examples, the quality indicator includes a value corresponding to a sparsity of detected watermarks and the instructions cause the one or more processors to change a level of watermark encoding based on the value.

In some examples, the example instructions further cause the one or more processors to determine a watermark payload, the watermark payload based on a characteristic of the media rendering device.

Also disclosed herein is an example device that includes means for receiving a media signal; means for generating a watermark; means for activating the means for generating to generate the watermark based on an external input; means for an encoding the media signal with the watermark to synthesize an encoded media signal; and means for rendering the encoded media signal.

In some examples, the means for activating is to deactivate the means for generating after a period of time after receipt of the external input.

In some examples, the example device also includes means for receiving a quality indicator based on a level of watermarking detected by a meter.

In some examples, the means for encoding is to modify the encoded media signal based on the quality indicator.

In some examples, the quality indicator includes a value corresponding to a sparsity of detected watermarks and the means for encoding is to change a level of watermark encoding based on the value.

In some examples, the example device also includes means for extracting a watermark payload, the watermark payload based on a characteristic of the device.

Also disclosed herein is an example method for watermarking media at a point of rendering the media. The example method includes: generating, by executing instructions with a processor, a watermark in a media rendering device, the watermark to be generated for a media signal received by the media rendering device, the watermark generation triggered by an external input to the media rendering device; encoding, by executing instructions with the processor, the media signal with the watermark to synthesize an encoded media signal; and presenting, by executing instructions with the processor, the encoded media signal to a user from the media rendering device.

In some examples, the example method includes deactivating, by executing instructions with the processor, the generating of the watermark after a period of time after receipt of the external input.

In some examples, the example method includes receiving, by executing instructions with the processor, a quality indicator based on a level of watermarking detected by a meter.

In some examples, the example method includes modifying, by executing instructions with the processor, the encoded media signal based on the quality indicator.

In some examples, the quality indicator includes a value corresponding to a sparsity of detected watermarks, and the example method further including changing, by executing instructions with the processor, a level of watermark encoding based on the value.

In some examples, the example method includes determining a watermark payload, the watermark payload based on a characteristic of the media rendering device.

Also disclosed herein is an example apparatus that includes memory including machine reachable instructions; and processor circuitry to execute the instructions to: generate a watermark in a media rendering device, the watermark to be generated for a media signal received by the media rendering device, the watermark generation triggered by an external input to the media rendering device; encode the media signal with the watermark to synthesize an encoded media signal; and present the encoded media signal to a user from the media rendering device.

In some examples, the processor circuitry is to deactivate the watermark generation after a period of time after receipt of the external input.

In some examples, the processor circuitry is to receive a quality indicator based on a level of watermarking detected by a meter.

In some examples, the processor circuitry is to modify the encoded media signal based on the quality indicator.

In some examples, the quality indicator includes a value corresponding to a sparsity of detected watermarks and the processor circuitry is to change a level of watermark encoding based on the value.

In some examples, the processor circuitry is to determine a watermark payload, the watermark payload based on a characteristic of the media rendering device.

Also disclosed herein is an example system to watermark media at a point of rendering the media. The example system includes a meter including a transmitter to broadcast a presence of the meter; and a media watermarking device. The media watermarking device includes a media receiver to receive a media signal, a watermark generator to generate a watermark, a trigger to activate the watermark generator to generate the watermark based on a detected presence of the meter, an encoder to encode the media signal with the watermark to synthesize an encoded media signal, and a media output to render the encoded media signal.

In some examples, the meter and the media rendering device are in physical proximity.

In some examples, the meter and the media rendering device are in the same room.

In some examples, the trigger is to deactivate the watermark generator after a period of time after detection of the presence of the meter.

In some examples, the meter includes a watermark detector to detect the watermarks in the encoded media signal.

In some examples, the meter transmits a quality indicator based on a level of watermarking detected, and the media rendering device includes a feedback receiver to receive the quality indicator.

In some examples, the encoder is to modify the encoded media signal based on the quality indicator.

In some examples, the quality indicator includes a value corresponding to a sparsity of detected watermarks and the encoder is to change a level of watermark encoding based on the value.

In some examples, the media rendering device further includes a watermark payload extractor to determine a watermark payload, the watermark payload based on a characteristic of the device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device comprising:
   at least one memory;
   instructions in the device; and
   processor circuitry to execute the instructions to at least:
      activate generation of watermarks based on detection of a presence of a meter external to the device, the watermarks to be encoded in a media signal, the media signal including a plurality of channels;
      change, based on an assigned quality indicator from the meter, at least one of a channel or a combination of channels of the media signal in which the watermarks are encoded to synthesize an encoded media signal, the assigned quality indicator based on strength values of previous watermarks detected by the meter, the strength values based on amplitudes of the previous watermarks detected by the meter; and
      output the encoded media signal.

2. The device of claim 1, wherein the meter is a wearable meter.

3. The device of claim 1, wherein the processor circuitry is to deactivate the generation of the watermarks after a period of time after the detection of the presence of the meter.

4. The device of claim 1, wherein the assigned quality indicator is further based on a level of watermarking detected by the meter.

5. The device of claim 1, wherein the assigned quality indicator is further based on a value corresponding to a sparsity of detected watermarks.

6. The device of claim 1, wherein the processor circuitry is to determine a watermark payload, the watermark payload based on a characteristic of the device.

7. A non-transitory computer readable medium comprising computer readable instructions that, when executed, cause one or more processors of a media rendering device to at least:
   activate watermark generation based on detection of a presence of an external meter, the watermarks to be encoded in a media signal, the media signal including a plurality of channels;
   change, based on an assigned quality indicator from the external meter, at least one of a channel or a combination of channels of the media signal in which watermarks are encoded to synthesize an encoded media signal, the assigned quality indicator based on strength values of previous watermarks detected by the external meter, the strength values based on amplitudes of the previous watermarks detected by the external meter; and
   present the encoded media signal.

8. The computer readable medium of claim 7, wherein the external meter is a wearable meter.

9. The computer readable medium of claim 7, wherein the instructions cause the one or more processors to deactivate the watermark generation after a period of time after the detection of the presence of the external meter.

10. The computer readable medium of claim 7, wherein the assigned quality indicator is further based on a level of watermarking detected by the external meter.

11. The computer readable medium of claim 7, wherein the assigned quality indicator is further based on a value corresponding to a sparsity of detected watermarks.

12. The computer readable medium of claim 7, wherein the instructions cause the one or more processors to determine a watermark payload, the watermark payload based on a characteristic of the media rendering device.

13. A method for watermarking media at a media rendering device, the method comprising:
   activating, by executing an instruction with at least one processor, generation of watermarks based on detection of a presence of a meter external to the media rendering device, the watermarks to be encoded in a media signal, the media signal including a plurality of channels;
   changing, by executing an instruction with the at least one processor, and based on an assigned quality indicator from the meter, at least one of a channel or a combination of channels of the media signal in which the watermarks are encoded to synthesize an encoded media signal, the assigned quality indicator based on strength values of previous watermarks detected by the meter, the strength values based on amplitudes of the previous watermarks detected by the meter; and
   outputting, by executing an instruction with the at least one processor, the encoded media signal.

14. The method of claim 13, further including deactivating the generation of the watermarks after a period of time after the detection of the presence of the meter.

\* \* \* \* \*